United States Patent
Münzenberger et al.

(10) Patent No.: US 6,706,774 B2
(45) Date of Patent: Mar. 16, 2004

(54) TWO-COMPONENT ON-SITE FOAM SYSTEM AND ITS USE FOR FOAMING OPENINGS FOR THE PURPOSE OF FIRE PROTECTION

(75) Inventors: Herbert Münzenberger, Wiesbaden (DE); Franz Heimpel, Affing (DE); Stefan Rump, Landsberg (DE); Christian Förg, Buchloe (DE); Wolfgang Lieberth, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 419 days.

(21) Appl. No.: 09/788,876

(22) Filed: Feb. 20, 2001

(65) Prior Publication Data

US 2002/0020827 A1 Feb. 21, 2002

(30) Foreign Application Priority Data

Feb. 22, 2000 (DE) .......................... 100 07 980

(51) Int. Cl.$^7$ .................................. C08J 9/04
(52) U.S. Cl. .............. 521/99; 521/100; 521/101; 521/104; 521/105; 521/106; 521/107; 521/109.1; 521/123; 521/124; 521/128; 521/172; 521/173; 521/174
(58) Field of Search .................. 521/99, 100, 101, 521/104, 105, 106, 107, 109.1, 123, 124, 128, 172, 173, 174

(56) References Cited

U.S. PATENT DOCUMENTS 4,237,238 A    12/1980    DeGuiseppi et al.
5,739,173 A  * 4/1998    Lutter et al. .................. 521/99
6,046,247 A  * 4/2000    Gluck et al. .................. 521/99

FOREIGN PATENT DOCUMENTS

| DE | 9528537 | 2/1997 |
| DE | 9544121 | 5/1997 |
| EP | 0217080 | 4/1987 |
| FR | 2283203 | 3/1976 |

* cited by examiner

Primary Examiner—John M. Cooney, Jr.
(74) Attorney, Agent, or Firm—Sidley Austin Brown & Wood, LLP

(57) ABSTRACT

A two-component on-site foam system for producing an intumescing fire protection foam is described with a density of less than 200 kg/m$^3$ and an increased fire resistance endurance, with a polyol component (A), which contains at least one polyol, one catalyst for the reaction between the polyol and the polyisocyanate, water or a blowing agent based on a compressed or liquefied gas as foam-forming agent and at least one intumescing material based on an acid-forming agent, a carbon-supplying compound and a gas-forming agent, and a polyisocyanate component (B), which contains at least one polyisocyanate, wherein the polyol component (A) contains at least one polyester polyol, at least one aminopolyol, at least one halogen-containing polyol, at least one acid-forming agent, expanding graphite and at least one ash crust stabilizer, the quantitative ratios of the polyols to the polyisocyanate or polyisocyanates being matched so that, when the polyol component (A) is mixed with the polyisocyanate component (B) as specified, the molar ratio of isocyanate groups of the polyisocyanate to the hydroxyl groups of the polyol (NCO:OH ratio) is larger than 1:1, as well as to the use of this system for filling openings, cable and pipe leadthroughs in walls, floors and/or ceilings of buildings with foam for the purpose of fire protection.

36 Claims, No Drawings

TWO-COMPONENT ON-SITE FOAM SYSTEM AND ITS USE FOR FOAMING OPENINGS FOR THE PURPOSE OF FIRE PROTECTION

BACKGROUND INFORMATION AND PRIOR ART

Intumescing polyurethane foams for fire protection purposes have been known for many years and are used as stuffing for seats in aircraft, trains and buses, as well as in the furniture industry, but also as blocking material for closing off openings, breaches, pipe and cable leadthroughs in walls, floors and ceilings, particularly in firewalls, and joint tapes, in order to prevent the spread of fire through these openings or joints. For the production of such intumescing foams, there is essentially the method of subsequently impregnating the foam by fulling in additives, that is, incorporating chemically intumescing additives, mainly based on phosphates, melamine, carbon-supplying substances and the like during the production of the foam, as well as incorporating swelling graphite during the preparation of the foam, optionally with the use of additional additives.

For example, the EP 0 400 402 describes fire-protection elements based on polyurethane foam materials, which contain swelling graphite, phosphorous-containing polyols, borates and/or ethylenediamine salts and optionally are equipped additionally and conventionally to be anti-inflammatory and/or contain conventional anti-inflammatory additives, fillers or auxiliary materials. These fire protection elements are used as construction materials, in that the polyurethane foam is cured and, from the cured material, the construction element is developed in the respectively desired shape, so that these separation elements can be assembled on site from individual pieces, optionally using adhesives, and installed. The foam materials obtained have a bulk density of more than 200 kg/m$^3$.

These and all other known foam systems for preventive fire protection are machine-manufactured molded parts or blocks of the foam cut to size, which must be incorporated as finished molded parts at the building site. This means that appropriate blocks must be kept in storage or corresponding costs arise for the adaptation.

From the DE-A 38 28 544 and the EP 0 192 888, high resilient, flame-protected polyurethane foams for upholstery purposes are already known which, to improve their flame protection properties, contain expanding graphite and other additives for producing an intumescing crust, in order to achieve insulation by these means and to retard the rate of burning. Normally, these polyester foams have a bulk density of less than 100 kg/m$^3$ (mostly about 50 kg/m$^3$) and is produced on a large industrial scale according to the REM method (Reaction Injection Mode). However, they do not have the fire resistance endurance of two hours at an installed depth of 100 mm, which is required for pipe and cable leadthroughs.

OBJECT OF THE INVENTION

The object of the present invention is to provide an intumescing foam system, which can be processed at the building site without the use of machinery and with a high foam yield (at a density of less than 200 kg/m$^3$) and provides a fire protection foam of increased fire resistance endurance.

SUMMARY OF THE INVENTION

This objective is accomplished by the two-component on-site foam system of claim 1. The dependent claims relate to preferred embodiments of this object as well as to the use of this two-component on-site foam system for filling openings and cable and pipe leadthroughs in walls, floors and/or ceilings of buildings with foam for the purpose of fire protection.

Surprisingly, it has turned out that, by reacting a polyol component, which contains at least one polyester polyol, at least one aminopolyol, at least one halogen-containing, preferably brominated polyol, at least one acid-forming agent, expanding graphite and at least one ash crust stabilizer, with a polyisocyanate component in a molar ratio of isocyanate groups to hydroxyl groups of more than 1:1, a foam system is obtained which, in the event of a fire, does not intumesce or does so only a little and, at the same time, forms a stable ash crust, which is not removed during the fire. In this way, it is possible to achieve an ASTM 814 fire resistance endurance of 3 hours at an installed depth of 100 mm without additional auxiliary materials and to do this with a two-component on-site foam system, which is formed at the building site by introducing the mixed components into the opening that is to be closed off.

The invention therefore relates to a two-component on-site foam system for producing an intumescing fire protection foam with a density of less than 200 kg/M$^3$ and an increased fire resistance endurance with a polyol component (A), which contains at least one polyol, one catalyst for the reaction between the polyol and the polyisocyanate, water or a blowing agent based on a compressed or liquefied gas as foam-forming agent and at least one intumescing material based on an acid-forming agent, a carbon-supplying compound and a gas-forming agent, and a polyisocyanate component (B), which contains at least one polyisocyanate, wherein the polyol component (A) contains at least one polyester polyol, at least one aminopolyol, at least one halogen-containing polyol, at least one acid-forming agent, expanding graphite and at least one ash crust stabilizer, the quantitative ratios of the polyols to the polyisocyanates being matched so that, when the polyol component (A) is mixed with the polyisocyanate component (B) as specified, the molar ratio of isocyanate groups of the polyisocyanate to the hydroxyl groups of the polyol (NCO: OH ratio) is larger than 1:1.

In accordance with a preferred embodiment of the invention, the polyol component (A) contains 3 to 40 percent by weight and preferably 5 to 30 percent by weight of polyester polyol, 3 to 50 percent by weight and preferably 5 to 20 percent by weight of aminopolyol, 5 to 20 percent by weight and preferably 10 to 15 percent of a halogen-containing, preferably brominated polyol, 5 to 30 percent by weight and preferably 10 to 20 percent by weight of an acid forming agent, 1 to 20 percent by weight and preferably 2 to 10 percent by weight of a carbon-supplying compound, 1 to 10 percent by weight and preferably 5 to 8 percent by weight of at least one melamine compound as gas-forming agent and 10 to 40 percent by weight of expanding graphite.

Preferably, a polyester polyol is used with a functionality of 1.5 to 5 and a hydroxyl number of 100 to 700. The aminopolyol preferably has a functionality of 2 to 5 and a hydroxyl number of 200 to 700, while the halogen-containing, preferably brominated polyol preferably has a functionality of 2 to 5 and a hydroxyl number of 100 to 500, while the polyisocyanate component (B) advantageously contains a polyisocyanate with a functionality of more than 2 and an NCO content of 20 to 40 percent. Such polyols are known to those skilled in the art and are commercially obtainable.

The polyisocyanate component (B) contains, as polyisocyanate, materials usually used for polyurethane foams, such as aliphatic, cycloaliphatic, araliphatic, aromatic or heterocyclic polyisocyanates, particularly 4,4'-methylenedi(phenyl isocyanate), toluylene diisocyanate, isopropyl diisocyanate, hexamethylene diisocyanate or one of the customary isocyanate prepolymers.

The polyol component (A) may additionally containing diether polyols, hydroxyl-terminated polybutadiene and/or polyethylene glycol.

Pursuant to the invention, a salt or an ester of an inorganic, non-volatile acid, selected from sulfuric acid, phosphoric acid or boric acid, is used as acid-forming agent. Particularly preferred acid-forming agents are ammonium phosphate, ammonium polyphosphate, diamine phosphates, esters of phosphoric acid with polyols, such as pentaerythritol, melamine phosphates, such as melamine orthophosphate, dimelamine orthophosphate, dimelamine pyrophosphate or melamine polyphosphate, boric acid salts, such as melamine borate, and/or borate esters.

The polyol component (A) preferably contains 1 to 20 percent by weight and especially 2.5 to 10 percent by weight of the ash crust stabilizer, for which purpose preferably a particulate metal from the group, comprising aluminum, magnesium, iron and a zinc, is used. Surprisingly, it has turned out that the addition of such a particulate metal leads to a significant stabilization of the intumescence crust in the event of a fire.

The particulate metal may be present in the form of a powder, platelets, flakes; fibers, flakes, threads and/or whiskers, the particulate metal in the form of powder, platelets or flakes having a particle size of less than 50 $\mu$m and preferably of 0.5 to 10 $\mu$m. In the event that the particulate metal is used in the form of fibers, threads and/or whiskers, a thickness of 0.5 to 10 $\mu$m and a length of 10 to 50 $\mu$m are preferred.

As ash crust stabilizer, an oxide or a compound of a metal from the group comprising aluminum, magnesium, iron or zinc, can be used alternatively or additionally, in particular, iron oxide, especially iron trioxide, titanium dioxide, a borate, such as zinc borate and/or sintered glass of low-melting glasses with a melting temperature preferably at about 400° C.

As carbon-supplying compound for the intumescing material, preferably a polyhydroxy compound and/or a thermoplastic or duroplastic polymeric resin binder, such as carbohydrates, for example, sugars or starch, pentaerythritol, dipentaerythritol, phenolic resins, urea resins, polyurethanes, polyvinyl chloride, poly(meth)acrylates, polyvinyl acetate, polyvinyl alcohol, silicone resins, polybutadienes, polybutenes and/or rubbers is used.

As gas-forming agent for the intumescing material, preferably chlorinated paraffins, melamine, melamine compounds, especially melamine cyanurate, melamine phosphate, melamine polyphosphate, tris(hydroxyethyl) cyanurate, dicyandiamide and/or guanidine salts, especially guanidine phosphate or guanidine sulfate, are used.

The polyol component (A) contains a conventional catalyst for the reaction between the polyol and the polyisocyanate, such as an aromatic and/or aliphatic secondary or tertiary amine, an organometallic compound of a metal from the group comprising zinc, tin, manganese, magnesium, bismuth, antimony, lead and calcium, especially an octoate, naphthenate or acetylacetonate of these metals.

In accordance with a preferred embodiment of the invention, the polyol components (A) and/or the polyisocyanate components (B) contain, as a blowing agent based on a compressed or liquefied gas, air, nitrogen, carbon dioxide, dinitrogen oxide, a fluorinated hydrocarbon, such as Freon 134a or 227, dimethyl ether, butane or propane.

It is furthermore possible to add an additional organic or inorganic fire retardant to the polyol component (A) and/or the polyisocyanate component (B). As fire retardant, red phosphorus, phosphorus compounds, especially halogenated phosphate esters such as trichloroethyl phosphate, tris(2-chloroisopropyl)) phosphate, triphenyl phosphate or tris(2-chlorethyl) phosphate, metal hydroxides, especially aluminum hydroxide or magnesium hydroxide, zinc borate and ammonium polyphosphate, as well as optionally antimony oxide as synergist, are suitable.

To improve the handling and for adjusting the viscosity and the flow properties of the inventive two-component on-site foam system during the mixing and production, it is possible to add a thixotropic material and/or a diluent or solvent, such as hydrophobic or hydrophobized silica as a thixotropic agent and aliphatic alcohols, such as butanol, as solvent.

It is furthermore possible to add to the polyol component (A) and/or the polyisocyanate component (B) additionally at least one inorganic filler, such as metal oxides, borates, carbonates, preferably chalk, silicates, kaolin, glass powder, iron oxide, titanium dioxide, silica, inorganic foams, preferably foamed expanding clay, perlite and vermiculite, and/or hollow spheres of a silicate material or glass.

Of course, it is readily possible to incorporate conventionally used and known auxiliary materials and additives, such as stabilizers, plasticizers, catalysts, solvents and/or dyes and pigments, etc. in the polyol component (A) and/or the polyisocyanate component (B).

By appropriately selecting the components and the quantitative ratios of polyol component (A) and polyisocyanate (B), the reaction rate, the viscosity as well as the cross-linking density of the polyurethane foam obtained can be adjusted selectively in the manner known to the expert.

In accordance with a preferred embodiment of the inventive two-component on-site foam system, the polyol component (A) and the polyisocyanate component (B) are contained separately in a two-chamber or multi-chamber device, which inhibits reaction, and can be caused to react under use conditions, while the ratio of NCO: OH of more than 1:1 is maintained. In this way, the components, which are present in these separate containers, such as plastic bags, can be mixed on site, that is, at the construction site, and brought into the openings, which are to be closed off, and foamed and cured to the desired compartmentalization. For this purpose, the two components are expressed from these containers either under the action of a blowing agent present in the respective containers or also with the help of mechanical forces, mixed, for example, with the help of a static mixer and brought into the openings, which are to be closed off, over a spray nozzle. In so doing, the preferred two-component on-site foam system is to be expelled from two-component cartridges with static mixers, from two-chamber bags or from two-component aerosol cans. Since the foam, so attained and not yet cured, is stable and not liquid, it can also be applied overhead and in layers and makes possible a hermetic compartmentalization even of irregularly shaped openings and the filling up of intersections, which is possible only with great difficulty if at all with conventional prefabricated fire protection molded parts.

For conventional, intumescing polyurethane foam parts with a foam density of 200 to 300 kg/m$^3$, an installed depth of 200 mm is necessary for an ASTM 814 fire resistance endurance of two hours. On the other hand, the inventive foam, with a much lower density of 130 to 150 kg/m³, surprisingly makes possible a fire resistance endurance of two hours already at an installed depth of only 100 mm.

The following example serves to explain the invention further.

EXAMPLE

A polyol component (A) is prepared by mixing the following components:

5 g aminopolyol (Voranol RA 800)
49.5 g aminopolyol (Lupranol 3402)
20 g polyester polyol (Therol 352)
15.0 g brominated polyol (Fox-O-Pol VD 280a)
5.0 g butanol
0.5 g cell stabilizer
4 g catalyst (Jeffcat ZF 10)
0.4 g PIR catalyst (catalyst 1b)
0.6 g water
2 g hydrophobic silica (Aerosil 200)
18 g ammonium polyphosphate
3.125 g dipentaerythritol
3.125 g melamine cyanurate
5 g iron oxide
5 g zinc borate
30 g expanding graphite and the following components are mixed to form the polyisocyanate component (B):

89 g 4,4'-methylenedi(phenyl isocyanate)
11 g tris(2-chloroisopropyl) phosphate

The two components, in equal volumes, are added to separate containers, for example, to a two-component cartridge.

When the two components are mixed in a ratio by volume of 1:1, a foaming reaction composition is obtained which, because of its viscosity, can be readily introduced even overhead into an opening, which is to be closed off, where the material continues to foam and cure, so that, at an installed depth of 100 mm, an ASTM fire resistance of 3 hours is obtained in a concrete wall.

What is claimed is:

1. A two-component on-site foam system for producing an intumescing fire protection foam with a density of less than 200 kg/m³ and an increased fire resistance endurance, comprising:
    a polyol component (A), containing at least one polyol, one catalyst for the reaction between the polyol and the Polyisocyanate, water or a blowing agent based on a compressed or liquefied gas as a foam-forming agent and at least one intumescing material based on an acid-forming agent,
    a carbon-supplying compound and a gas-forming agent, a polyisocyanate component (B), containing at least one polyisocyanate, wherein the polyol component (A) contains at least one polyester polyol, at least one aminopolyol at least one halogen-containing polyol, at least one acid-forming agent, expanding graphite and at least one ash crust stabilizer, the quantitative ratios of the polyols to the polyisocyanate or polyisocyanates being matched so that, when the polyol component (A) is mixed with the polyisocyanate component (B) as specified, the molar ratio of isocyanate groups of the polyisocyanate to the hydroxyl groups of the polyol (NCO:OH ratio) is larger than 1:1.

2. The two-component on-site foam system of claim 1, wherein the polyol component (A) contains 3 to 40 percent by weight of polyester polyol, 3 to 30 percent by weight of aminopolyol, 5 to 20 percent by weight of a halogen-containing polyol, 5 to 30 percent by weight of an acid forming agent, 1 to 20 percent by weight of a carbon-supplying compound, 1 to 10 percent by weight of at least one melamine compound as gas-forming agent and 10 to 40 percent by weight of expanding graphite.

3. The two-component on-site foam system of claim 1, wherein the polyol component (A) contains a polyester polyol with a functionality of 1.5 to 5 and a hydroxyl number of 100 to 700, an anunopolyol with a functionality of 2 to 5 and a hydroxyl number of 200 to 700 and a halogenated, preferably brominated polyol with a functionality of 2 to 5 and a hydroxyl number of 100 to 500 and the polyisocyanate component (B) contains a polyisocyanate with a functionality of more than 2 and an NCO content of 20 to 40 percent.

4. The two-component on-site foam system of claim 1, wherein a salt or an ester of an inorganic, non-volatile acid, selected from the group consisting of sulfuric acid, phosphoric acid and boric acid, is, contained as acid-forming agent.

5. The two-component on-site foam system of claim 4, wherein ammonium phosphate, ammonium polyphosphate, a diamine phosphate, an ester of phosphoric acid with a polyol, a melamine phosphate, dimelamine orthophosphate, dimelamine pyrophosphate or melamine polyphosphate, a boric acid salt and/or a boric acid ester is contained as acid-forming agent.

6. The two-component on-site foam system of claim 1, wherein the polyol component (A) contains 1 to 20 percent by weight and preferably 2.5 to 10 percent by weight of an ash crust stabilizer.

7. The two-component on-site foam system of claim 6, wherein a particulate metal selected from the group consisting aluminum, magnesium, iron and zinc is contained as ash crust stabilizer.

8. The two-component on-site foam system of claim 7, wherein the particulate metal is present in the form of a powder, platelets, flakes, fibers, threads and/or whiskers.

9. The two-component on-site foam system of claim 8, wherein the particulate metal, in the form of a powder, platelets or flakes, has a particle size of not more than 50 µm.

10. The two-component on-site foam system of claim 9, wherein the particulate metal has a particle size of 0.5 to 10 µm.

11. The two-component on-site foam system of claim 9, wherein the fibers, threads and/or whiskers of the particulate metal have a thickness of 0.5 to 10 µm and a length of 10 to 50 µm.

12. The two-component on-site foam system of claim 6, wherein an oxide or a compound of a metal selected from the group consisting of aluminum, magnesium, iron and zinc, is contained as ash crust stabilizer.

13. The two-component on-site foam system of claim 12, wherein iron oxide, titanium dioxide, a borate and/or sintered glass from a low-melting glass, is contained as ash crust stabilizer.

14. The two-component on-site foam system of claim 1, wherein a polyhydroxy compound and/or a thermoplastic or duroplastic polymeric resin binder is contained as carbon-supplying compound.

15. The two-component on-site foam system of claim 14, wherein a carbohydrate, pentaerythritol, dipentaerythritol, phenolic resins, a urea resin, a polyurethane, polyvinyl chloride, poly(meth)acrylate, polyvinyl acetate, polyvinyl alcohol, a silicone resin, a polybutadiene, a polybutene and/or a rubber, is contained as a carbon-supplying compound.

16. The two-component on-site foam system of claim 1, wherein the polyol component (A) contains chlorinated paraffin, melamine, and a melamine compound, tris (hydroxyethyl) cyanurate, dicyandiamide and/or a guanidine salt, especially guanidine phosphate or guanidine sulfate, as gas-forming agents.

17. The two-component on-site foam system of claim 1, wherein the polyol component (A) contains an aromatic and/or aliphatic secondary or tertiary amine, an organometallic compound of a metal selected from the group consisting of zinc, tin, manganese, magnesium, bismuth, antimony, lead and calcium, as catalyst for the reaction of the polyol with the polyisocyanate.

18. The two-component on-site foam system of claim 1, wherein the polyol component (A) and/or the polyisocyanate component (B) contain, as a blowing agent based on a compressed or liquefied gas, a composition selected from the group consisting of air, nitrogen, carbon dioxide, dinitrogen oxide, a fluorinated hydrocarbon, dimethyl ether, butane or propane.

19. The two-component on-site foam system of claim 1, wherein the polyol component (A) and/or the polyisocyanate component (B) contains an additional organic or inorganic flame retardant.

20. The two-component on-site foam system of claim 17, wherein red phosphorus, a phosphorus compound, a metal hydroxide, zinc borate and ammonium polyphosphate is contained as fire retardant.

21. The two-component on-site foam system of claim 1, wherein the polyol component (A) and/or the polyisocyanate component (B) contain a thixotropic agent and/or a diluent or solvent.

22. The two-component on-site foam system of claim 21, wherein the thixotropic agent is hydrophobic or hydrophobized silica.

23. The two-component on-site foam system of claim 21, wherein an aliphatic alcohol is contained as diluent or solvent.

24. The two-component on-site foam system of claim 1, wherein the polyol component (A) and/or the polyisocyanate component (B) additionally contains an inorganic filler.

25. The two-component on-site foam system of claim 21, wherein a metal oxide, a borate, a carbonate, preferably chalk, a silicate, kaolin, glass powder, iron oxide, titanium dioxide, silica, an inorganic foam, perlite and vermiculite, and/or hollow spheres of a silicate material or glass is contained as inorganic filler.

26. The two-component on-site foam system of claim 1, wherein the polyol component (A) and/or the polyisocyanate component (B) additionally contains known auxiliary materials and additive, stabilizers, plasticizers, catalysts, solvents and/or dyes and pigments.

27. The two-component on-site foam system of claim 1, wherein the polyol component (A) and the polyisocyanate component (B) are contained separately, to inhibit reaction, in a two-chamber or multi-chamber device and, under use conditions, can be reacted while the NCO:OH ratio of more than 1:1 is maintained.

28. The two-component on-site foam system of claim 5 wherein the polyol is pentaerythritol, the melamine phosphate is the melamine monoorthophosphate and the boric acid is melamine borate.

29. The two-component on-site foam system of claim 13, wherein the iron oxide is $Fe_2O_3$, the borate is zinc borate, and the melting temperature of at least 400° C.

30. The two-component on-site foam system of claim 15, wherein the carbohydrate is selected from the group consisting of sugar and starch.

31. The two-component on-site foam system of claim 16, wherein the melamine compound is selected from the group consisting of melamine cyanurate, melamine phosphate, melamine polyphosphate.

32. The two-component on-site foam system of claim 17, wherein the calcium is selected from the group consisting of octoate, naphthenate and acetylacetonate.

33. The two-component on-site foam system of claim 18, wherein the fluorinated hydrocarbon is selected from the group consisting of Freon 134a and Freon 227.

34. A two-component on-site foam system of claim 20, wherein a phosphorus compound is phosphate ester selected from the group consisting of trychioroethyiphosphate, tris (2-chloroisopropyl), phosphate, triphenyl phosphate and tris (2-chiorethyl) phosphate, and wherein the metal hydroxide is selected from the group consisting of aluminum hydroxide and magnesium hydroxide.

35. The two-component on-site foam system of claim 34, comprising antimony oxide as synergist.

36. The two-component on-site foam system of claim 25, wherein the inorganic foam is a foamed expanding clay.

* * * * *